(12) United States Patent
Journade (10) Patent No.: US 8,844,862 B2
(45) Date of Patent: Sep. 30, 2014

(54) AFT PYLON FAIRING FOR AIRCRAFT ENGINE SUSPENSION SYSTEM, COMPRISING A HEAT SHIELD CAPABLE OF EXPANDING FREELY

(71) Applicant: Airbus Operations (SAS), Toulouse (FR)

(72) Inventor: Frédéric Journade, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 102 days.

(21) Appl. No.: 13/653,042

(22) Filed: Oct. 16, 2012

(65) Prior Publication Data

US 2013/0105622 A1 May 2, 2013

(30) Foreign Application Priority Data

Oct. 19, 2011 (FR) ...................................... 11 59427

(51) Int. Cl.
| B64D 27/00 | (2006.01) |
| B64D 29/02 | (2006.01) |
| B64D 27/12 | (2006.01) |

(52) U.S. Cl.
CPC ................ B64D 27/12 (2013.01); B64D 29/02 (2013.01)
USPC .............................. 244/54; 244/53 R; 60/796

(58) Field of Classification Search
USPC ............................ 244/54, 53 R; 60/796–798; 248/554–557
See application file for complete search history.

(56) References Cited

U.S. PATENT DOCUMENTS

| 4,238,092 A * | 12/1980 | Brennan .......................... 244/54 |
| 7,352,744 B2 * | 4/2008 | Saint Etienne et al. ........ 370/389 |
| 7,445,179 B2 * | 11/2008 | Diochon et al. ................. 244/54 |
| 7,797,947 B2 * | 9/2010 | Lafont et al. .................... 60/796 |
| 7,971,826 B2 * | 7/2011 | Journade et al. ................. 244/54 |
| 7,988,092 B2 * | 8/2011 | Bonnaud et al. .............. 244/121 |
| 8,061,649 B2 * | 11/2011 | Journade et al. ................. 244/54 |
| 8,118,252 B2 * | 2/2012 | Dumont et al. ................. 244/54 |

(Continued)

FOREIGN PATENT DOCUMENTS

| EP | 2190739 | 6/2010 |
| FR | 2832011 | 5/2003 |
| FR | 2920623 | 3/2009 |
| WO | WO 2009/037267 | 3/2009 |

OTHER PUBLICATIONS

"AFDX protocol tutorial," http://sierrasales.com/pdfs/AFDXTutorial.pdf, 2005, Condor Engineering, Santa Barbara, California, United States.

(Continued)

*Primary Examiner* — Christopher P Ellis
*Assistant Examiner* — Medhat Badawi
(74) *Attorney, Agent, or Firm* — Jenkins, Wilson, Taylor & Hunt, P.A.

(57) ABSTRACT

This invention relates to an aft pylon fairing for the suspension system of an aircraft engine, comprising a main structure extending along a longitudinal direction of said fairing and integrating two side panels connected to each other, the fairing also comprising a heat protection deck mounted on said main structure through connection means comprising tabs designed to deform to accompany displacement of the deck relative to the main structure, if there is differential thermal expansion between these two entities.

12 Claims, 4 Drawing Sheets

(56) References Cited

U.S. PATENT DOCUMENTS

| | | | |
|---|---|---|---|
| 2003/0201366 A1* | 10/2003 | Connelly et al. | 244/121 |
| 2007/0102494 A1* | 5/2007 | Connelly et al. | 228/157 |
| 2008/0067292 A1* | 3/2008 | Bonnaud et al. | 244/199.1 |
| 2008/0217467 A1* | 9/2008 | Lafont | 244/54 |
| 2008/0224018 A1* | 9/2008 | Lafont et al. | 248/554 |
| 2008/0245926 A1* | 10/2008 | Journade et al. | 244/54 |
| 2008/0251633 A1* | 10/2008 | Journade et al. | 244/54 |
| 2009/0095443 A1* | 4/2009 | Connelly | 165/51 |
| 2009/0200418 A1* | 8/2009 | Beaufort | 244/54 |
| 2010/0051743 A1* | 3/2010 | Dumont et al. | 244/54 |
| 2010/0284313 A1* | 11/2010 | Monnier | 370/294 |
| 2011/0011972 A1* | 1/2011 | Vache | 244/54 |
| 2011/0155847 A1* | 6/2011 | Journade et al. | 244/54 |
| 2012/0080554 A1* | 4/2012 | Lafont et al. | 244/54 |
| 2013/0105622 A1* | 5/2013 | Journade | 244/54 |

OTHER PUBLICATIONS

French Search Report for Application No. FR 1159427 dated May 24, 2012.

* cited by examiner

AFT PYLON FAIRING FOR AIRCRAFT ENGINE SUSPENSION SYSTEM, COMPRISING A HEAT SHIELD CAPABLE OF EXPANDING FREELY

CROSS-REFERENCE TO RELATED APPLICATION

This application claims priority to French Patent Application No. 11 59427 filed Oct. 19, 2011, the entire disclosure of which is herein incorporated by reference.

TECHNICAL FIELD

This invention relates to an aft pylon fairing for an engine suspension system designed to be inserted between an aircraft wing and the engine concerned, this fairing being called the "APF" or "Aft Pylon Fairing".

The invention may be used on any type of aircraft fitted with turbojets or turboprops.

This type of suspension system, also called an "EMS" (Engine Mounting Structure), can be used to suspend a turbo-engine below the aircraft wing, or to mount this turbojet above this wing.

BACKGROUND

Such a suspension system is designed to form the connecting interface between a turbo-engine and a wing of the aircraft. It transmits forces generated by the associated turbo-engine to the aircraft structure, and also is used to route fuel, electrical and hydraulic and air systems between the engine and the aircraft.

The suspension system comprises a rigid structure also called the primary structure, often a <<box>> type structure, in other words formed by the assembly of lower and upper spars and side panels connected to each other by cross stiffening ribs, in order to transmit forces.

The system is also provided with suspension means inserted between the turbo-engine and the rigid structure, these means globally comprising two engine suspensions, and a system for resisting thrusts generated by the turbo-engine. In prior art, this force resistance system normally comprises two side connecting rods connected firstly to an aft part of the turbojet fan casing, and secondly to an aft suspension fixed onto the central part of the turbojet.

In the same way, the suspension system also comprises another series of suspensions forming a suspension system inserted between the rigid structure and the aircraft wing, this system normally being composed of two or three suspensions.

Moreover, the pylon is provided with a plurality of secondary structures segregating and maintaining the systems while supporting pylon fairing elements, which are usually in the form of assemblies of panels added onto the structures. As is well known to those skilled in the art, secondary structures are differentiated from the rigid structure by the fact that they are not designed to transfer forces from the engine to be transmitted to the aircraft wing.

The secondary structures include the aft pylon fairing, also called the APF, that has a plurality of functions including the formation of a thermal or fire resistant barrier, and the formation of aerodynamic continuity between the engine exhaust and the suspension pylon.

The aft pylon fairing is usually in the form of a box comprising two side panels assembled to each other by inner stiffening cross-ribs spaced at intervals from each other along a longitudinal direction of the fairing, and a heat protection deck. Note that this box is not necessarily closed opposite the heat protection deck, in other words in the upper part when the engine will be suspended under the aircraft wing, considering that this is the location at which it is connected to the other pylon structures.

The heat protection deck is provided with an outer surface designed to delimit the engine core flow which is delimited by this deck, while the engine fan flow is delimited by the outer surfaces of the side panels, due to their location in the annular fan flow duct of the engine, and/or at the engine exhaust.

In some solutions according to prior art, the opposite ends of the heat protection deck are mounted fixed to the corresponding two side panels that also match the cross ribs. Alternately or simultaneously, the deck is fixed onto the cross ribs.

In this configuration the heat protection deck is in contact with the very hot core engine flow, which means that it deforms strongly due to thermal expansion. However, its corresponding embedments into the lower ends of the two side panels and/or the lower ends of the cross-ribs create high thermomechanical stresses within the deck and the elements into which it is embedded, which is obviously not good for these elements.

Note that this phenomenon through which high thermomechanical stresses are introduced due to the large thermal expansion of the deck is accentuated by the fact that the side panels are immersed in the fairly cool fan flow, such that their deformation caused by thermal expansion is very small. Nevertheless, they are affected by significant deformation caused by the stresses set up resulting from the expansion of the deck to which they are directly and rigidly connected, which degrades their aerodynamic shape and more generally deteriorates the global aerodynamic quality of the fairing. Naturally, such degradation increases the generated parasite drag.

Consequently, note that the aerodynamic quality of the fairing is also degraded by local deformations of the heat protection deck which cannot expand freely unstressed, because it is built into some fairing elements such as the inner ribs, as described above. Since the core engine flow is a very fast jet, local deformations encountered at the deck create a fairly large parasite drag.

Finally, note that the fairly cool fan flow is not directly delimited by the surface of the inner cross ribs due to their location inside the box, and the ribs may be sensitive to heat transferred from the heat protection deck with which they are in contact. Thus, to enable these ribs to perform their function to mechanically support the different elements of the box-shaped fairing, it may be necessary to oversize them and/or to use expensive materials with good heat resistance properties to manufacture them.

To solve the problems that have just been mentioned, it is proposed to shift the heat protection deck in order to move it away from the side panels and the transverse ribs. This embodiment is known particularly from documents EP 2 190 739 and U.S. Ser. No. 12/677,139.

The deck is shifted from the transverse inner ribs by means of longitudinal walls, it being understood that these are the same walls that are indirectly used to mount the deck on the ribs. Thus, the deck is no longer mounted on the ribs directly, which advantageously allows the deck to deform more freely due to thermal expansion following the large amount of heat released by the core engine flow delimited by this deck.

Nevertheless, there is still a need to optimise the design of the fairing, such that the fairing enables greater freedom of expansion of the heat protection deck along the longitudinal direction.

SUMMARY

Therefore, the purpose of the invention is to at least partially correct the disadvantages mentioned above relative to embodiments according to prior art.

To achieve this, the purpose of the invention is an aft pylon fairing for an engine suspension system, that will be inserted between an aircraft wing and said engine, said fairing forming a box comprising a main structure extending along a longitudinal direction (X) of said fairing and integrating two side panels connected to each other, the fairing also comprising a heat protection deck provided with an outer surface that delimits a core engine flow from said engine, said heat protection deck being mounted on said main structure through connection means.

According to the invention, said connection means comprise a plurality of tabs each comprising a plane main portion, the width of which is oriented parallel to the transverse direction (Y) of the fairing, said plane portion being oriented such that in a section along any plane parallel to the longitudinal (X) and vertical (Z) directions passing through the plane main portion, this plane main portion is in the form of a straight segment locally orthogonal to said heat protection deck. Furthermore, said tabs are designed so that they can deform to accompany displacement of said heat protection deck relative to said main structure of the fairing if there is differential thermal expansion between these two entities.

Therefore the solution disclosed in this invention can improve management of the differential thermal expansion between the main structure of the fairing and the deck, particularly along the length direction of the deck, namely approximately in the longitudinal direction. The tabs arranged in the manner defined above very satisfactorily accompany expansion of the thermal shield along its length direction, by strongly limiting or even entirely preventing parasite deformations of the deck along other directions. This deformation is then preferably in the form of curved tabs along lines parallel to the transverse direction corresponding to the preferred deformation mode of these tabs.

Therefore, the deck is not mounted rigidly on the main structure of the fairing, which advantageously allows it to deform more freely by thermal expansion as a result of the large heat quantities released by the core engine flow delimited by this deck. This is verified not only for deformation by expansion along the length direction, but also for deformation by expansion along the transverse direction.

Thermomechanical stresses occurring in the deck subsequent to such expansions are very much smaller than stresses that occur in previous embodiments. Consequently, local potential deformations that might degrade the aerodynamic quality of this deck are strongly reduced. The result is an improvement in the global aerodynamic quality of the fairing, significantly reducing parasite drag effects and thereby improving the performance/consumption ratio of the aircraft.

All the advantages mentioned above are accentuated by the fact that the rigid direct mechanical link between the deck and the side panels is also preferably eliminated, to create a mechanical break extending longitudinally between these elements, therefore the deck is capable of expanding without taking the side panels with it.

Note also that the particular orientation of the plane main portions of the tabs, namely locally orthogonal to the heat protection deck, is capable of very satisfactorily resisting the acoustic pressure applied normal to the outside surface of this deck. The tabs are particularly well adapted to have good resistance to compression along the length direction of the plane portions and the high acoustic pressure encountered during some engine conditions, while allowing the required flexibility when they are stressed along the length direction of the deck during thermal expansion of the deck.

Preferably, said tabs are distributed in transverse rows, these rows being at a spacing from each other along the longitudinal (X) direction. The rows are capable of optimising thermal expansion of the deck along the transverse direction, without excessively stressing this deck. The tabs are preferably spaced from each other to enhance this benefit within each row.

Preferably, each tab has a first end arranged at the deck end, and a second end arranged at said main structure of the fairing.

In this respect, said first end preferably forms an integral part of the said plane main portion and is fixed onto a stiffener support itself fixed to the deck. Nevertheless, the stiffener is optional and a direct attachment would be possible without going outside the scope of the invention.

Furthermore, said second end preferably prolongs said plane main portion, being curved along an axis of a curvature parallel to the transverse direction. The curvature can follow an arc of a circle. In any case, the deformation of each tab accompanying the thermal expansion of the deck is characterised by the accentuation of the curvature of the second end, and/or by the curvature of the plane main portion.

Preferably, each tab has a thickness of between 0.5 and 5 mm, and a total length of between 50 and 200 mm along the length direction of its plane main portion.

Preferably, the length of the plane main portion of each tab represents 50 to 95% of the total length of the tab, along the length direction of this plane main portion.

Preferably, the main structure of the fairing and the heat protection deck are fitted with stop means to block displacement of said heat protection deck relative to said main fairing structure, preferably along the X direction.

Preferably, said heat protection deck does not have any rigid mechanical connection directly with said side fairing panels. For information, these panels are only added indirectly on the heat protection deck through tabs, themselves fixed to other elements of the main structure for connection of the two side panels. In other words, there is a longitudinal mechanical break between the deck and each of the side panels.

Another purpose of the invention is an engine suspension system that will be inserted between an aircraft wing and the engine, this system comprising an aft pylon fairing like that described above.

Another purpose of the invention is an engine assembly comprising an engine such as a turbojet and a suspension system for this engine, this system complying with what has just been described.

Finally, another purpose of this invention is an aircraft comprising at least one such engine assembly.

Other advantages and characteristics of the invention will become clear in the non-limitative detailed description given below.

BRIEF DESCRIPTION OF THE DRAWINGS

This description will be made with reference to attached drawings among which.

DETAILED DESCRIPTION

Figure 1:
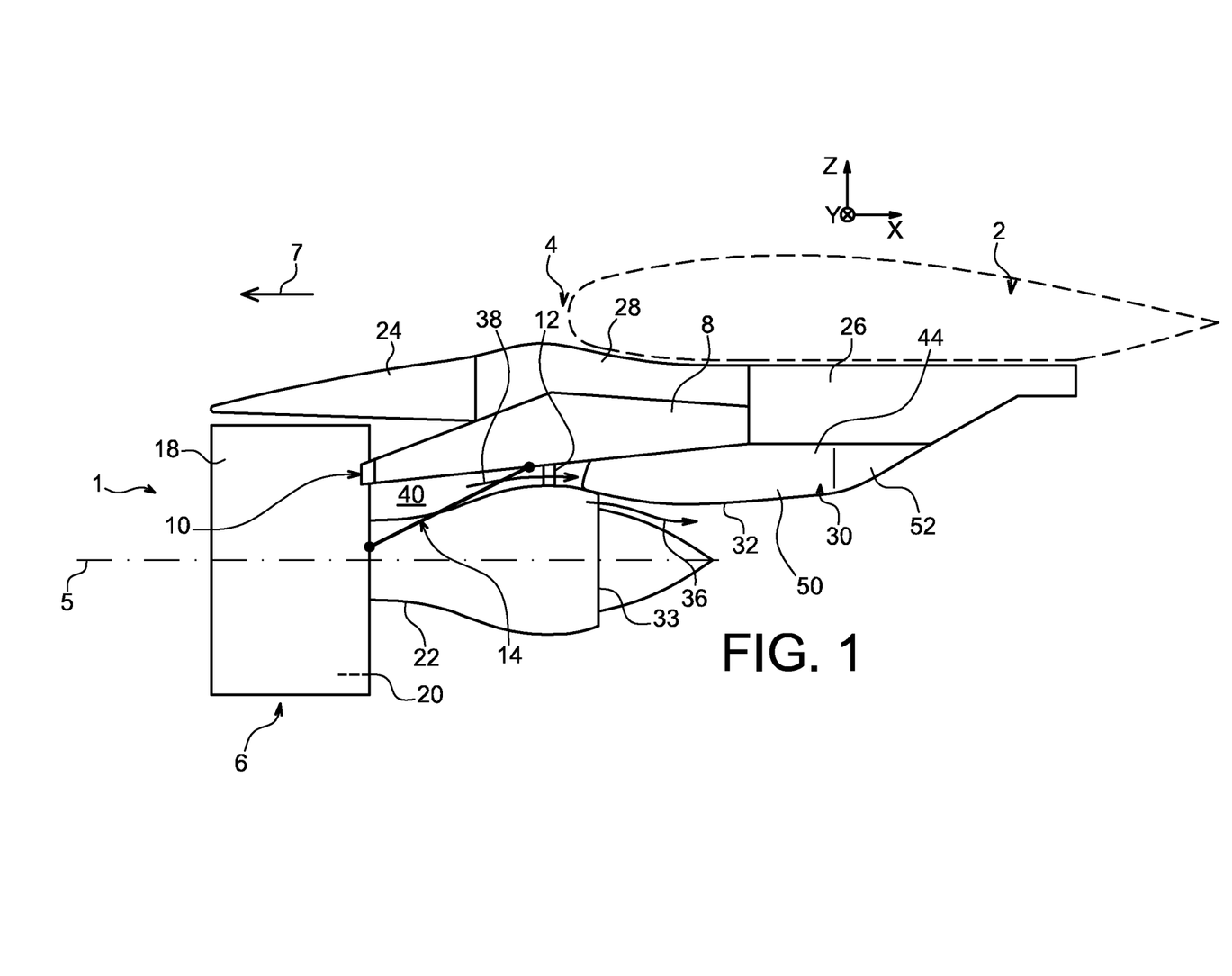
FIG. 1 shows a diagrammatic side view of an engine assembly for an aircraft, comprising a suspension system according to a preferred embodiment of this invention.

FIG. 1 shows an aircraft engine assembly 1 to be fixed under a wing 2 of this aircraft, this assembly comprising a suspension system 4 according to a preferred embodiment of this invention, and an engine 6 such as a turbojet suspended under this system 4.

Globally, the suspension system 4 comprises a rigid structure 8, also called the primary structure, carrying the suspension means for the engine 6, these suspension means being provided with several engine suspensions 10, 12, and a system 14 for resisting thrusts generated by the engine 6.

Note that the assembly 1 will be surrounded by a nacelle (not shown) and that the suspension system 4 comprises another series of suspensions (not shown) added onto the rigid structure 8 and that suspend this assembly 1 under the aircraft wing 2.

Throughout the following description, by convention, X is the longitudinal direction of the system 4 and is also effectively the longitudinal direction of the turbojet 6 and the longitudinal direction of the aft pylon fairing that will be presented below, this X direction being parallel to a longitudinal axis 5 of this turbojet 6. The Y direction is oriented in the direction transverse to the system 4 and is also effectively the transverse direction of the turbojet 6 and the transverse direction of the aft pylon fairing, while Z is the vertical direction or the height, these three directions X, Y and Z being orthogonal to each other.

Furthermore, the terms <<forward>> and <<aft>> should be considered relative to a direction of movement of the aircraft developed as a result of the thrust applied by the turbojet 6, this direction being shown diagrammatically by the arrow 7.

Therefore, FIG. 1 includes the two engine suspensions 10, 12, the thrust resistance system 14, the rigid structure 8 of the suspension system 4 and a plurality of secondary structures added onto the rigid structure 8. These secondary structures segregating and maintaining the systems while supporting pylon fairing elements will be described below.

Note that the turbojet 6 is provided with a large fan casing 18 at its forward end delimiting an annular fan duct 20, and with a smaller central casing 22 at its aft end, enclosing the core of this turbojet. The casings 18 and 22 are obviously rigidly fixed to each other.

As can be seen in FIG. 1, there are two engine suspensions 10, 12 for the system 4, and they are called the forward engine suspension and the aft engine suspension respectively.

In this preferred embodiment of this invention, the rigid structure 8 is in the form of a box extending from the aft end towards the forward end, approximately along the X direction.

The box 8 is then in the form of a pylon with a design similar to that usually observed for turbojet suspension pylons, particularly in that it is provided with cross ribs (not shown) each in the form of a rectangle oriented in a YZ plane.

The suspension means of this preferred embodiment comprise firstly the forward engine suspension 10 inserted between a forward end of the rigid structure 8 also called the pyramid, and an upper part of the fan casing 18. The forward engine suspension 10 is designed conventionally in a manner known to those skilled in the art.

Secondly, the aft engine suspension 12, also made in a conventional manner known to those skilled in the art, is inserted between the rigid structure 8 and the central casing 22.

Also with reference to FIG. 1, the secondary structures of the pylon 4 include a forward pylon structure 24, an aft pylon structure 26, a connection fairing 28 for the forward and aft pylon structures, and an aft pylon fairing 30, called the lower aft pylon fairing in this configuration in which the engine is located under the wing.

Globally, these secondary structures are conventional elements identical to or similar to those encountered in prior art and known to those skilled in the art, except for the aft pylon fairing 30 that will be described in detail below.

More precisely, the forward pylon structure 24 is placed in the lower forward extension of the wing 2 and above the primary structure 8. It is mounted fixed onto the rigid structure 8 and it forms an aerodynamic profile between an upper part of the fan covers hinged on this part, and the leading edge of the wing. This forward pylon structure 24 then not only forms a pylon fairing, but is also used for placement, segregation and routing of the different systems (air, electrical, hydraulic, fuel). Furthermore, since the forward part of this structure 24 is not in contact with the rigid structure 8, a heat exchanger is usually inserted in the space defined between these two elements.

The connection fairing 28, also called the <<karman>>, is located directly in the aft prolongation of this structure 24, and still under the wing and mounted above the rigid structure 8. Then, further towards the aft direction, the connection fairing 28 is prolonged by the aft pylon structure 26 that contains part of the pylon equipment. This structure 26 is preferably located aft from the rigid structure 8, and is therefore suspended under the aircraft wing.

Finally, there is the Aft Pylon Fairing 30 under the rigid structure 8 and the aft pylon structure 26. It essentially forms a heat barrier also called a fire barrier that protects the pylon and the wing from heat dissipated by the core engine flow, and aerodynamic continuity between the engine exhaust and the suspension pylon.

In a manner known to those skilled in the art, the fairing 30 mentioned above comprises a heat protection deck 32 provided with an outer surface that will delimit the core engine flow that the deck partially delimits radially outwards, this core engine flow output from the engine nozzle 33 being shown diagrammatically by the arrow 36. Furthermore, the fairing 30 also comprises two side panels 44 with outer surfaces that delimit the fan flow from the engine shown diagrammatically by the arrow 38, due to their location in the annular fan duct 40 of the fan flow from the engine, and/or at the engine exhaust.

Note that in the preferred embodiment described in which the engine 6 will be suspended under the aircraft wing, the heat protection deck 32 protecting the pylon and the wing from the core engine flow 36 forms a lower portion of the fairing 30. Naturally, this deck would form an upper portion of the fairing in the alternate case in which the engine is designed to be mounted above the wing.

Finally, as can be seen in FIG. 1, the forward end of the deck 32 matches the upper aft end of the nozzle 33, or is very close to this aft end of nozzle 33.

Now with reference to FIGS. 2 to 6, the figures show the aft pylon fairing 30 in more detail, in the general shape of a box that will be mounted on the aft pylon structure 26 and the rigid structure 8. The fairing 30 preferably comprises a plane of symmetry P corresponding to an XZ plane, this plane P also forming a vertical plane of symmetry for the entire suspension system 4 and for the engine 6.

Figure 2:
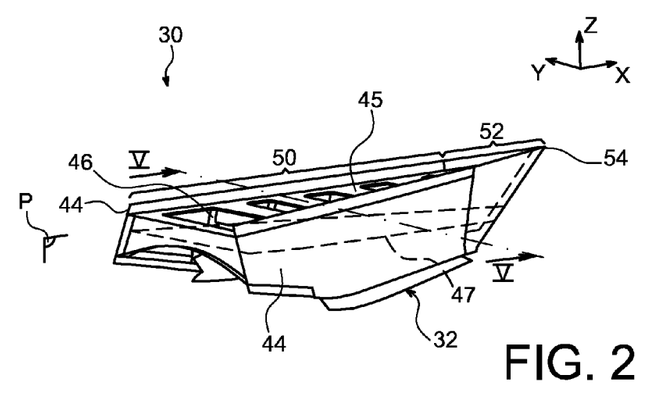
FIG. 2 shows a partial perspective view of the aft pylon fairing used on the suspension system shown in FIG. 1, this fairing also being a purpose of this invention.
Figure 3:
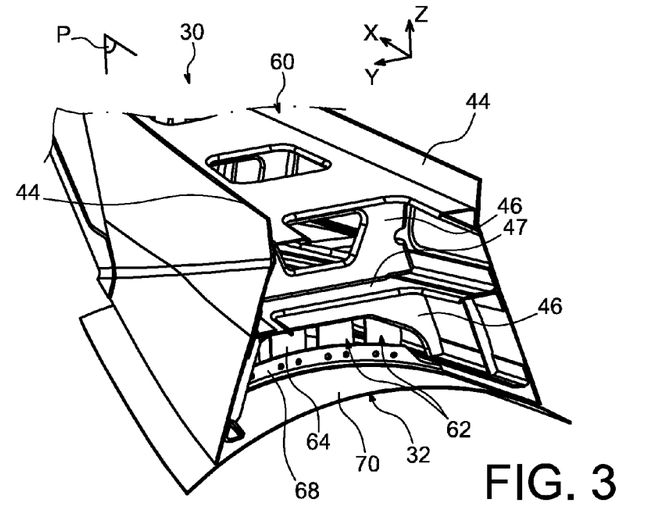
FIG. 3 shows an enlarged perspective view of a part of the fairing shown in FIG. 2, in a transverse section.
Figure 4:
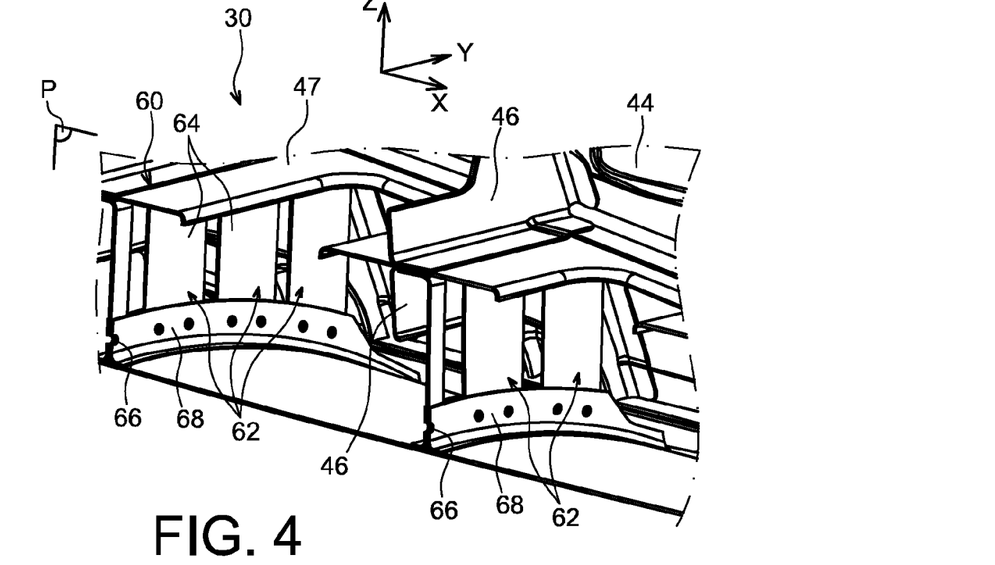
FIG. 4 shows an enlarged perspective view of a part of the fairing shown in FIG. 2, in a longitudinal section.

With reference more particularly to FIG. 2, the box-shaped aft pylon fairing 30 comprises the two side panels 44 each oriented approximately in an XZ plane on each side of the plane P. They are assembled to each other by an upper spar 45, an intermediate spar 47 and inner transverse stiffener ribs 46 at a spacing from each other along the X direction, each of these ribs 46 being oriented along a YZ plane and for example being in the global form of a rectangle, a square or a U. The spars 45, 47 also extend approximately parallel to each other along XY planes and are preferably perforated.

The side panels 44, each possibly split into an upper portion and a lower portion, are installed fixed and directly onto the side portions of each of the inner ribs 46 by conventional means known to those skilled in the art. The same applies for their installation on the longitudinal edges of the spars 45, 47.

Furthermore, the fairing 30 integrates the heat protection deck 32 in the lower part of the box, this deck also extending approximately parallel to the spars 45, 47.

Still in this FIG. 2, it can be seen that the fairing 30 is broken down into two distinct portions fixed to each other, namely a forward portion 50 forming the major part of the fairing, for example 60 to 85% of the fairing lengthwise along the X direction, and a small aft portion 52 globally in the form of a pyramid or a tip, the base of which is rigidly connected to the forward portion 50, and the vertex 54 of which forms an aft end of the fairing 30. For guidance, the forward portion 50 has a fairly uniform cross-section along its entire length.

The side panels 44 extend preferably each in a single piece from one end of the fairing 30 to the other, in other words both along the forward portion 50 and along the aft portion 52. On the other hand, the heat protection deck 32 preferably extends in a single piece only along at least part of the forward portion 50, and not along the aft portion 52, although this could obviously be envisaged without going outside the scope of the invention. This special feature is explained particularly by the fact that the pyramid-shaped aft portion 52 progressively moves away from the centreline of the engine, such that the core engine flow that in any case loses some of its heat intensity as it moves in the aft direction, has less effect on the temperature of the lower closing element of the pyramid 52.

Note also that the fact that each of the elements mentioned above is made from a single piece does not mean that these parts cannot be manufactured from several distinct portions rigidly fixed to each other, for example several subsequent portions along the X direction.

With reference to FIGS. 3 to 6, the figures show the fairing 30 in more detail. The ribs 46 are distributed into upper ribs connecting the spars 45, 47, and lower ribs extending the upper ribs downwards from the intermediate spar 47. The upper ribs are square or rectangular in shape, while the lower ribs are in the form of an upside down U. These ribs 46 are preferably attached to the spars 45, 47 using sole plates fitted on these ribs by welding or bolting. Their attachment to the side panels 44 may be made in a similar manner or directly on the edge of these ribs, also by welding or bolting.

The spars 45, 47, the ribs 46 and the side panels 44 together form a main structure 60, of which the component elements are rigidly fixed to each other. This structure 60 supports the deck 32 with some flexibility using connection means specific to this invention, which will now be described.

These means comprise a plurality of metal tabs 62, preferably made of stainless steel, distributed in transverse rows. These rows, for example three of them, are at a spacing from each other along the X direction. Each includes several tabs 62 parallel to each other and at a spacing from each other along the Y direction. For example, each row may comprise six tabs 62.

Figure 5:
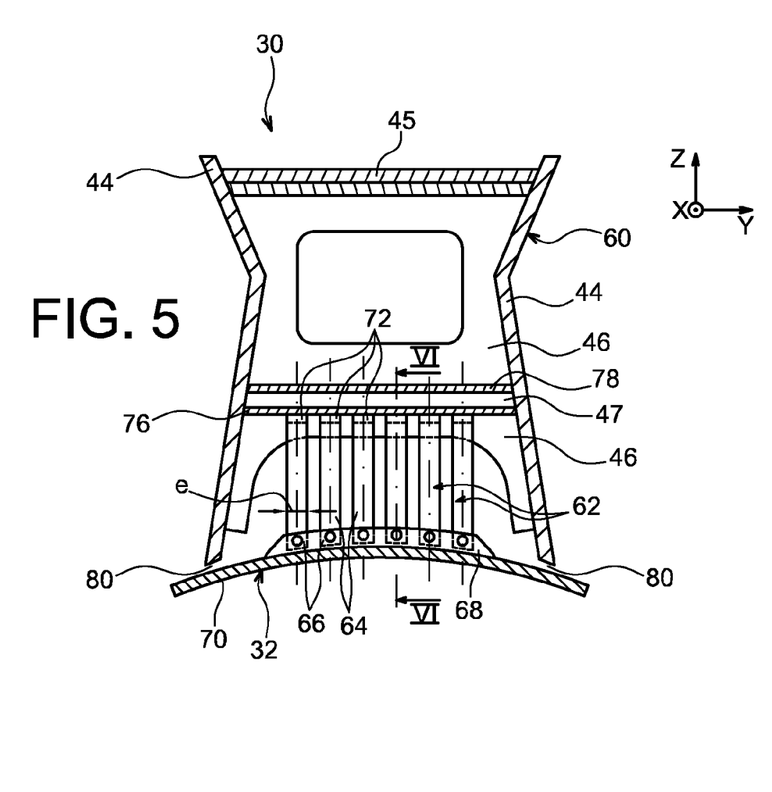
FIG. 5 shows a cross-sectional view taken along line V-V in FIG. 2.
Figure 6:
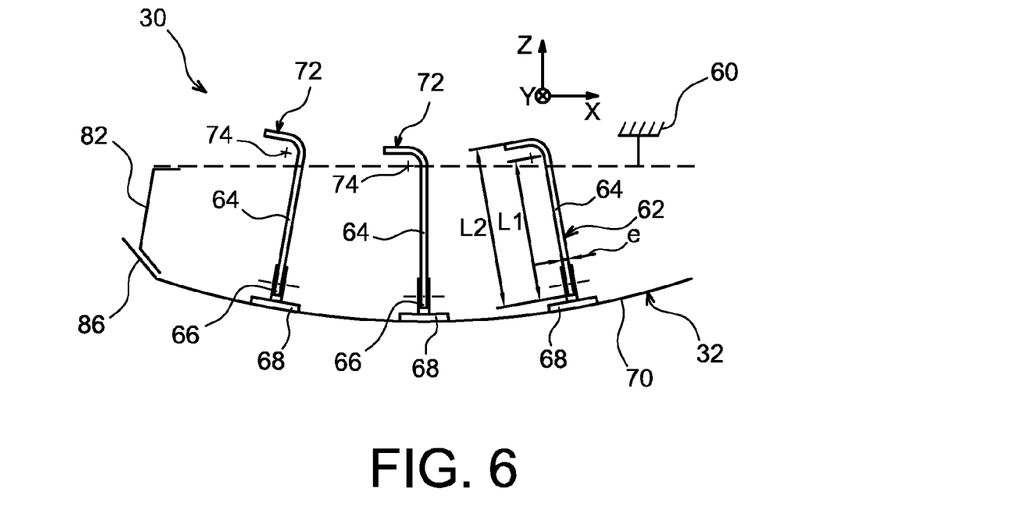
FIG. 6 shows a diagrammatic cross-sectional view taken along line VI-VI in FIG. 5.

With reference more specifically to FIGS. 5 and 6, we will now describe one of the tabs 62, knowing that they are all identical or similar in design, which gives them some flexibility so that they can accompany a displacement of the heat protection deck 32 relative to the main structure 60 if there is a differential thermal expansion between these two entities.

Each tab 62 has a constant width "l" and thickness "e", values of the order of 10 to 100 mm may be adopted for the width and values of the order of 0.5 to 5 mm may be adopted for the thickness. These values are identical for each tab, unlike their length that can vary as a function of the geometry of the deck 32 that they support.

In this respect, note that each tab 62 has a straight main portion 64, the length L1 of which may be of the order of 25 to 190 mm. This straight main portion 64 forms the essential part of the tab, the length L1 corresponding to 50 to 95% of the total length L2 of the tab, referenced in FIG. 6. Thus, this length L2 may be of the order of 50 to 200 mm.

Each tab comprises a first end 66, which in this case is an integral part of the straight portion 64. It is assembled on a stiffener support 68 preferably by bolting, the stiffener support 68 itself being welded onto the inner surface of the deck 32. Note that the ends 66 of all tabs in the same row are assembled to the same stiffener support 68, for example in the form of an upside down T section, and extending in the approximately transverse direction over the entire width of the deck 32.

The tab 62 also comprises a second end 72 that extends the plane portion 64, with a curve preferably shaped like an arc of a circle, the axis of curvature of which is parallel to the Y direction. For example, the curvature can result in an angle of about 90° between the plane portion 64 that it prolongs and the plane terminal part of the end 72.

Therefore, the tab forms an upside down L, in which the base corresponding to the terminal part mentioned above is used for attachment on the intermediate spar 47. More precisely, with reference to FIG. 5, the terminal part of the end 72 bears in contact with the upper sole plate 76 of the lower rib 46, itself bearing in contact with the intermediate spar 47. Therefore the bolts used for attachment of the tab can pass through all these elements including the lower sole plate 78 of the upper rib 46 bearing on the spar 47.

Alternately, in the case in which the plane portion 64 represents 100% of the tab, it will be mounted directly on the web of the rib 46.

The orientation of the tabs 62 is such that the plane main portions 64 are parallel to the Y direction, with the width "l" oriented parallel to the Y direction. Furthermore, for each of these portions 64, a section of this portion 64 along an arbitrary XZ plane passing through the plane main portion 64 like the cut plane in FIG. 6, is in the form of a straight segment locally orthogonal to the deck 32 and therefore to its aerodynamic surface 70.

The tabs 62 alone suspend the deck 32 on the main structure 60 of the fairing. In particular, there is no direct rigid mechanical link between the side panels 44 and this deck, clearances 80 possibly being provided between these elements.

FIG. 6 shows that the main structure 60 is equipped with a stop 82 at its forward end. This stop cooperates with a complementary stop 86 provided at the forward end of the deck 32. In the non-operational state of the engine as shown in FIG. 6, the stops are in contact with each other or facing each other with a small clearance in order to limit the relative displacement along the X direction between the deck and the structure 60, such a displacement being likely to occur due to the flexibility of the tabs 62.

Figure 7:
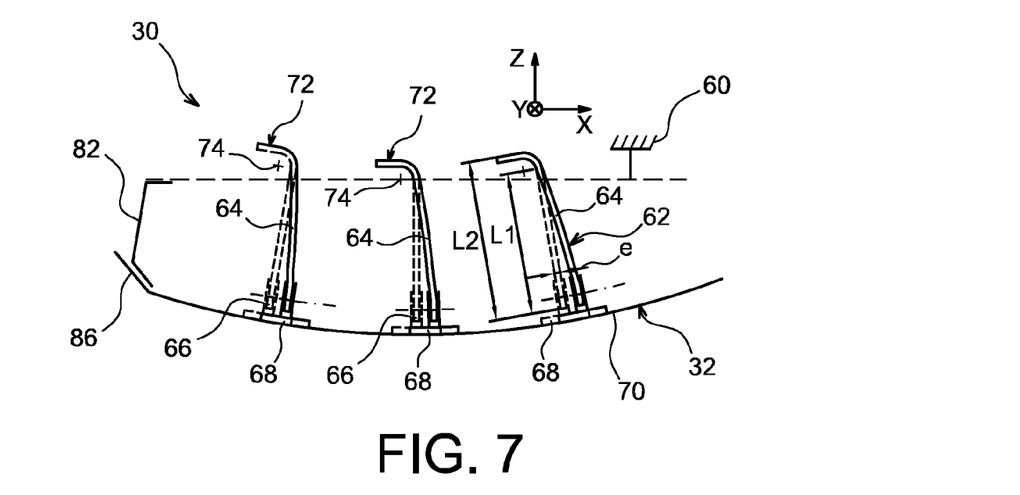
FIG. 7 shows a view similar to the view in FIG. 6, in a configuration adopted during operation of the engine, causing a differential thermal expansion between the heat protection deck and the main structure of the fairing.

During operation of the engine, the thermal expansion of the deck is greater than the thermal expansion of the main structure 60 for the reasons mentioned above. During these differential thermal expansion phases, the tabs 62 accompany the relative displacement between these elements by deforming according to their preferred deformation mode, leading each of them to curve/bend along an axis parallel to the width, in other words parallel to the Y direction. The curvature may apply to the plane portion 64 and/or the second curved end 72. Such a configuration is shown in FIG. 7, on which it can be seen that the deformation of the deck by expansion along the X direction takes place starting from the contact between the stops 82, 86 that block this deck along this X direction.

During differential thermal expansion phases, the tabs 62 accompany the relative displacement between these elements along the Y direction, deforming slightly along this Y direction. The fact that they are narrow facilitates this deformation.

The orthogonality of the straight portions 64 of the tabs, locally with respect to the deck 32, allows the deck to deform essentially along its length direction and therefore to limit vertical displacements. Thus, clearances between the deck 32 and the side panels are maintained even during engine operation phases during which the differential thermal expansion phenomenon described above occurs.

Finally, note that the elements of the main structure 60 may be metallic or may be made of a composite material, while the deck itself is preferably metallic, for example made of titanium or Inconel. Nevertheless, other materials can be envisaged for this deck, for example ceramic, composite, etc.

Obviously, those skilled in the art could make various modifications to the invention that has just been described through non-limitative examples. In this respect, note particularly that although the engine assembly 1 has been presented in a configuration appropriate for suspension under the aircraft wing, configuration of this assembly 1 could also be different such that it could be mounted above this wing.

The invention claimed is:

1. An aft pylon fairing of a suspension system for insertion between a wing of an aircraft and an engine, said fairing comprising:
   a main structure extending along a longitudinal direction of the fairing and two side panels integrally formed therewith, the two side panels being connected to each other,
   a heat protection deck comprising an outer surface for delimiting a core engine flow from said engine, said heat protection deck being mounted on said main structure via a plurality of tabs,
   wherein each of the plurality of tabs comprises a plane main portion, the width of which is oriented parallel to the transverse direction of the fairing, said plane main portion being oriented such that in a section along any plane parallel to the longitudinal and vertical directions passing through the plane main portion, this plane main portion is in the form of a straight segment locally orthogonal to said heat protection deck, and
   wherein the tabs are deformable for accommodating displacement of said heat protection deck relative to said main structure of the fairing for differential thermal expansion between the two entities.

2. The fairing according to claim 1, wherein the tabs are distributed in transverse rows, these rows being at a spacing from each other along the longitudinal direction.

3. The fairing according to claim 1, wherein each tab has a first end arranged at the deck end, and a second end arranged at said main structure of the fairing.

4. The fairing according to claim 3, wherein the first end forms an integral part of the said plane main portion, and is fixed onto a stiffener support itself fixed to the deck.

5. The fairing according to claim 3, wherein the second end prolongs said plane main portion being curved along an axis of a curvature parallel to the transverse direction.

6. The fairing according to claim 1, wherein each tab has a thickness of between 0.5 and 5 mm, and a total length of between 50 and 200 mm along the length direction of its plane main portion.

7. The fairing according to claim 1, wherein the length of the plane main portion of each tab comprises 50 to 95% of the total length of the tab, along the length direction of this plane main portion.

8. The fairing according to claim 1, wherein the main structure of the fairing and the heat protection deck are fitted with a stop to block displacement of said heat protection deck relative to said main fairing structure.

9. The fairing according to claim 1, wherein said heat protection deck and said two longitudinal walls do not have any rigid direct mechanical link with said side panels of the fairing.

10. A suspension system for an engine designed to be inserted between an aircraft wing and said engine, wherein it comprises an aft pylon fairing according to claim 1.

11. An engine assembly comprising an engine and a suspension system for the engine according to claim 10.

12. An aircraft comprising at least one engine assembly according to claim 11.

* * * * *